United States Patent Office.

REUBEN A. ADAMS, OF CAMBRIDGE, MASSACHUSETTS.

*Letters Patent No. 97,145, dated November 23, 1869.*

IMPROVEMENT IN CURING AND PRESERVING FISH.

The Schedule referred to in these Letters Patent and making part of the same.

I, REUBEN A. ADAMS, of Cambridge, in the county of Middlesex, and State of Massachusetts, have invented a new and useful Process for Curing and Preserving Fish, of which the following is a specification.

Nature and Objects of the Invention.

The nature of my invention consists in subjecting such fish or pieces of fish as it is desirable to preserve for future use to a bath, saturation, or impregnation of saltpetre, either in its natural or powdered state, or in solution, as will be more fully described.

General Description.

To enable others skilled in the art of curing and preserving fish for the market to practise my invention, and thereby prevent or avoid the imperfections heretofore met with in use of any of the usual modes of curing fish, I will proceed to describe my improved process.

If the fish are to be cured by what is known as the dry-salting process, I use the saltpetre in its natural or powdered state with the common salt, but using only about one-half as much salt as in the old process, and using about one ounce of saltpetre to one pound of common salt.

If the fish are to be cured by pickling and drying or by smoking, I make a solution of saltpetre, using about six pounds of saltpetre to sixty gallons of sea-water, putting in as many fish as the solution will completely cover, and letting them remain a longer or shorter time, according as to whether they are to be dried or smoked.

If they are to be dried, I let them remain in the solution about four hours, when they are removed and dried in the sun, in the usual manner, or by artifical means, as may be preferred.

If they are to be smoked, I let them remain about two hours, when they are removed, and smoked in the usual manner.

The above proportions may be varied, to suit circumstances, as for instance, if the fish are to be kept a long time, the solution may be made stronger, or if intended to be kept a shorter time, the solution may be made weaker, or the salting-process may be entirely dispensed with, using only my solution, and then drying the fish.

It is well known that the greatest obstacle heretofore encountered in the preservation of fish has been the sweating and final decay, when exposed to a damp atmosphere or packed in tight boxes, which may be directly traced to the presence of certain unnutritious portions of the fish such as the bones, skin, and the mucous membrane between the skin and the flesh, all of which must be removed, in order to successful preservation by either of the old processes, which it is desirable to do to a certain extent, in order to reduce the bulk of the prepared article; but I have found, by experiment that it is very difficult to remove all the useless or deleterious substance by merely dissecting the fish and using common salt only.

I have also found that impregnating the fish with a solution of saltpetre, as stated above, will have the effect to destroy the tendency to sweating and decay, even though the useless portions may not all be removed, and thereby cause the fish to keep sweet a long time, and greatly protects it from the effects of a change of climate, while it imparts a more agreeable flavor to the fish.

I have also found that the application of my process to fish that have been cured by the dry-salting process, and have become soft and yellow, (which is the first step toward decay,) will effectually arrest the process of decay, and cause the fish to become hard and white.

Claim.

What I claim as my invention, and desire to secure by Letters Patent, is—

The use of saltpetre in the process of curing fish, in the manner and for purposes substantially as described.

Executed at Boston, Massachusetts, this 16th day of October, 1869.

REUBEN A. ADAMS.

Witnesses:
 DANA B. HANSON,
 G. E. WHITNEY.